G. W. Beaudslee.
Wood Planing Machine.
N° 8,098.    Patented May 20, 1851.
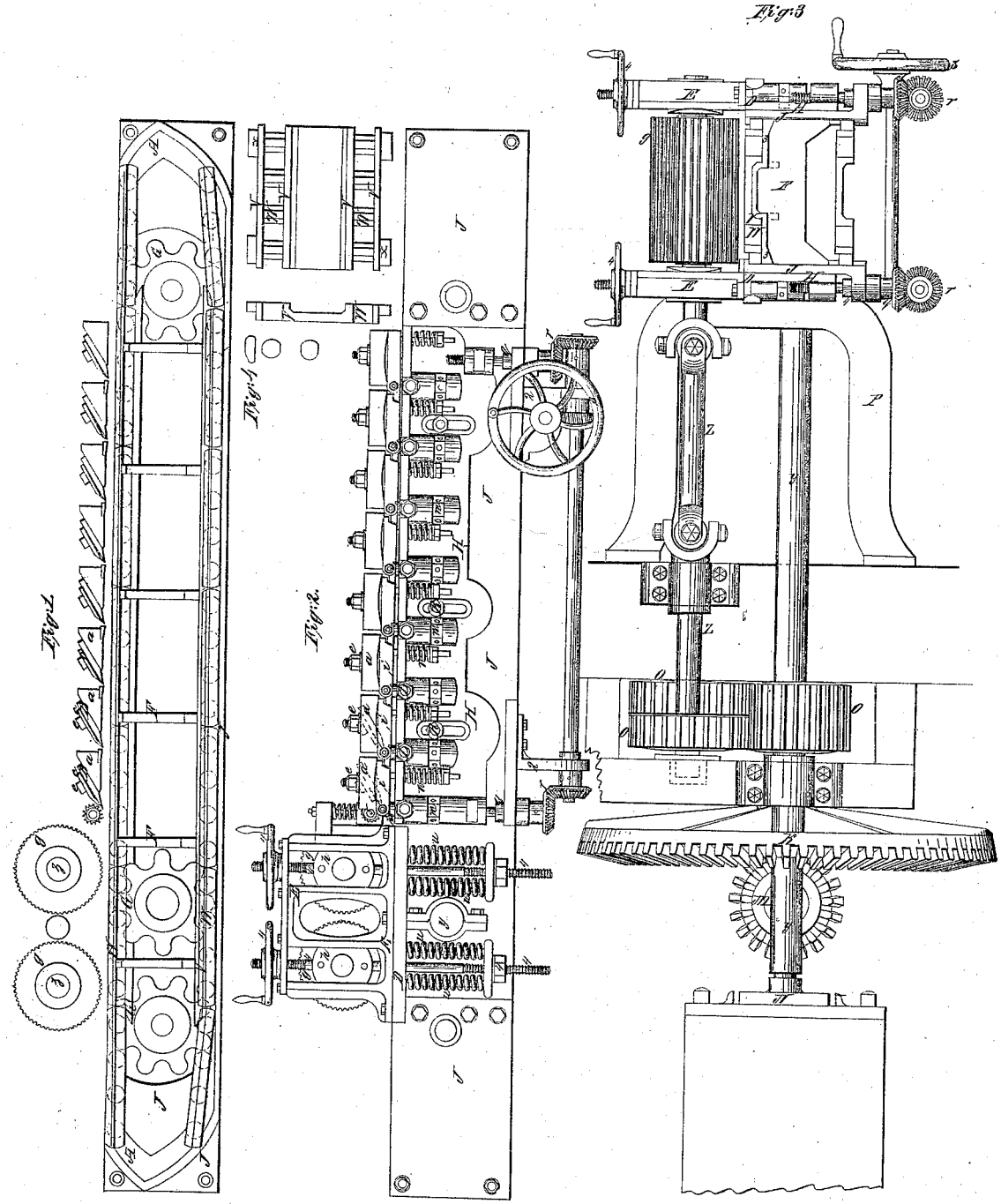

UNITED STATES PATENT OFFICE.

GEO. W. BEARDSLEE, OF BUFFALO, NEW YORK.

PLANING-MACHINE.

Specification of Letters Patent No. 8,098, dated May 20, 1851.

*To all whom it may concern:*

Be it known that I, GEORGE W. BEARDSLEE, of Buffalo, in the county of Erie and State of New York, have invented a new and useful Machine for Planing Boards and Plank and the Working of Moldings, &c.: and I do hereby declare the following to be a full, clear, and exact description of the same, reference being had to the accompanying drawings, making a part thereof, in which—

Figure 1, represents a vertical horizontal section through the planing machinery. Fig. 2, represents a top view of the machine. Fig. 3, represents an end view, and Fig. 4, a side view of one of the series of platforms for feeding in the material to be planed, with some of its parts in detail.

Similar letters in the several figures represent the same parts.

The nature of my invention, and that which distinguishes it from all other things before known, consists, first, in the elastic stock and cutter, they being so attached to the side plates or knife-stock frames, (to which all the stocks are attached) that the heel of the stock is made elastic without varying the graduation of the cutting edge of the knife. The knife is so fitted to the stock, and the stock so attached to the knife-stock-frame by a hinged bar and bolt that, the cutting edge is in an exact line with the center of the axle of the hinge. In all modes heretofore known and used, for fixing cutters to side plates or knife-stock frames, difficulties have occured, and have thus far prevented their practical operation, and which difficulties my improvements effectually removes and obviates.

In all fixed stocks and cutters, where they are firmly bolted to the side plates, whether the board or cutters be moved to produce a continued shaving—splinters or "wedges" are taken from the board, where it is cutting against the grain, and are firmly bedded under a fixed stock, thereby causing great resistance and pressure, and frequently a "breaking up" of the stocks or bed. This is an almost invariable result in running a larger portion of the lumber required to be worked by power machines. But, when the stocks are made elastic, this does not occur; if it should however, the splinters and "wedges," are permitted to pass out, by the elasticity of the stocks. A fixed stock or cutter without a self adjustable throat is inoperative from the fact that, if the cutters are graduated to any given thickness of shaving, the lumber must be of sufficient thickness to allow all the cutters to take off the shavings of the graduated thickness. If otherwise, it be thin, (as most lumber from the saw has great inequalities in its thickness) and a cutter graduated to an eighth of an inch shaving, and the thickness of the board only permits it to take off one half of that thickness (if against the grain) the wood before that cutter will be raised to the thickness of the graduation, and the board split in the direction of the grain to a considerable depth, and thereby clogging the throat, breaking and tearing the board, and if the board is separated, will form a wedge under the stock, and the next board in passing will "break up" the machine.

Another difficulty is found in practical operation with a fixed stock and cutter having a separate yielding bar for a throat or mouth piece; the bar cannot be made to operate as a self adjusting throat, it being held by springs at each end, and inserted between the cutters, it is raised by the board in passing; and being separate it is raised unequally, if the springs be fixed at the same pressure at the two ends, and the board passed through at any point on one side of the center of the bar, that end to which the board passes the nearest, will be raised the highest. The result being that, the bar bears hard on the edge of the board nearest the center, while it is raised clear from the other edge. This leaves that portion without a pressure, and if the cutters are working against the grain, the wood will be torn to a considerable depth and broken, the lumber destroyed, and the machine "broken up".

Separate bars combined with stationary stocks and cutters, are not self adjusting, but require perpetually to be altered to suit the width of lumber worked, and the difficulty in adjusting them to the proper pressure at the two ends of the bar to suit all and every width of board amounts to a prohibition of their practical use.

In my improved stock fastenings and cutters none of the above difficulties occur;

the edge of the cutter being at the point of the center of the axle, and the heel of the stock elastic, the stock itself presses upon the board, and holds it to the bed, and its bearing is always in line with the cut, whether the board is wide or narrow, or the springs be of unequal pressure or not, it is a self adjusting throat, and no wedges will be caused by an unequal pressure, in consequence of the bars not bearing equally on the board, and if any do occur, they will pass out with the shavings, and in no event can the heel of the stock be fixed below the line of cut, which is a great difficulty in all fixed stocks.

My other improvement consists, in the application for a bed or carrying table for the board, of the sectional endless platform. The operation of this for the purpose for which I design using it, is of great practical importance in machines of this class, where the power is all exerted in the feeding of the machine. The endless chain for this purpose being a pull instead of a push, has proved inoperative, from the fact that the machine is necessarily horizontal instead of vertical, and consequently all the dirt and grit falls into the machine and remains in the cutters; and under the heavy strain required to move the board the links in passing over the chain wheel, cut upon their axles, and in a short time become worthless. This has been the practical result of all endless chains for this purpose.

In the operation of the sectional plate bed, the plates push each other through under the cutters, and between the points where pressure is brought upon the plates there is not lateral motion given to them, and consequently no wear. In this mode of operation the whole power of the machine is required at the point where the rollers clamp the board to pass it through under the cutters. At this point immediately under the center of the axle of the roller, and under the plates, a little elevated from the fixed bed, are placed two friction rollers, thereby relieving this point from the friction of the bed and plates.

In my machine, the cutters being placed vertical, all the dirt, grit, and shavings pass off without aid;—all the gearing belts and pulleys are placed beneath the mill floor, thus avoiding the difficulties attending gear and belts when in close proximity to the machine.

Any desired speed can be given to this machine without danger to any of its parts, the amount which it can plane being only limited by the quantity which can be fed into the machine.

By the application of reverse cutters at the tail end of the machine, both sides of the board are planed at the same operation; and by also attaching matchers to that point, lumber can be planed and matched at the same operation, and which I purpose doing in my machine.

Immediately in front of the first cutter is placed a cast steel scorer of about two and a half inches in diameter, with sharp cutting edges formed on its periphery, and which is held firmly against the board by springs, and so fitted as to cut or score to the depth of the first shaving to be taken from the board. This scores the board crosswise of the grain, so that the shaving in separating from the board does not eat into the board, but is broken up.

To lubricate the sectional plates if desired, I fix a roller of soft material conforming with the shape of the under side of the plates and held against them by springs on their passage on the back of the machine, and which roller may receive or be saturated with the lubricating compound which is distributed to the plates.

My machine is constructed of iron or other material in the following manner: The frame I I I, is cast with the side plates and the cross bearers F, F, F, with the fixed bed 3, 3, 3, all in one piece. In the grooves A, A, between the side plates, are fitted the sectional plates B, B, B, to form the endless bed or carrying table for the lumber. These plates are cast of iron, and planed to an equal thickness, and on the underside of said plates is formed a recess to fit the bed 3, 3, 3, which guides them sidewise while passing under the cutters. Near either outer edge are formed racks into which the cogs of the wheels G, G, G, work. The plates at either end pass up and down in the grooves A, A, and are kept in their proper position by the lugs X, X, X, and the wheels G, G. The grooves at either end are in the form of a concentric, for the purpose of passing successively each one of the series of plates from the back to the front of the machine and vice versa. The fixed bed of the machine and the grooves are planed perfectly true to fit the plates. The feed rollers J, J, J, two in number, are placed in advance of the cutters, and are operated by the gear wheels O, O, O, underneath the floor, and are connected by the shafts Z, Z, Z, which are united together by universal joints to permit them to be operated at any desired point from the plate bed, and having their bearings in movable boxes $h$, $h$, which are fixed in the stands E, E, E, and are adjusted to any desired point by the spring bolts and nuts 4, 4, 4. The pinion M, M, M, operates the bevel gear $k$, $k$, which is attached to the main driving shaft $y$, $y$, to which the gear wheels G, G, are keyed to operate the plates—also the gear wheels O, O, to operate the rollers. The side plates or knife stock frames H, H, H, are made of cast iron, planed true, and fitted to the main frame, to which they are bolted by the bolts and nuts R, R, working in the slots in the side plates, which permit them to rise to any desired point for the different thicknesses of lumber. These plates are adjusted by the raising screws q, q, q, which may be operated by beveled gear and a hand wheel so as to move both ends of the plates simultaneously and with great precision. Upon these side plates or knife stock frames sockets are formed equal in number to that of the cutters into which the bolts p, p, p, are fitted. They are raised or lowered to any desired graduation of shaving by the nuts m, m, m, and made fast by the set screws L, L, L. The hinges i, i, i, are fixed to these bolts by the pieces k, k, k. To these hinges are bolted the knife stocks a, a, a, by the bolts and nuts e, e, e. These hinges are also held to the plates by the bolts and springs n, n, n, and o, o, o. On the socket bolts lugs are formed to support the heel of each preceding stock which keeps it in the same relative position to the cutting edge of the knife. To the knife stocks a, a, a, are bolted the knives and caps B, B, and c, c, which are so fitted to the stocks as to make the cutting edge of the knife in line with the center of the axle of the hinges, as shown by dotted lines in Fig. 2.

Underneath the heel of each stock are fitted pieces of steel f, f, f, to form the required throat. The cast steel scorer 5, 5, 5, is fitted in front of the first cutter and held by the springs o' o'. The main driving shaft rests in the step N, N, placed underneath the floor of the mill. The rollers g, g, are of such diameter as to travel with the same velocity as the sectional platform or bed, and are fluted on their periphery.

Having thus fully described my invention what I claim therein as new and desire to secure by Letters Patent is—

The yielding stock and cutter when made to yield upon an axle the center of which is in line with the cutting edge of the knife, and this I claim whether the socket bolt, hinged bar, and nut are or are not used for the purpose of graduating and adjusting the cutters as herein set forth.

GEORGE W. BEARDSLEE.

Witnesses:
H. C. VAN VORST,
L. L. BRITTON.